United States Patent
Söhner (10) Patent No.: US 7,532,945 B2
(45) Date of Patent: May 12, 2009

(54) DATA MODEL FOR SUPPLY CHAIN PLANNING

(75) Inventor: Volkmar A. Söhner, Sinsheim (DE)

(73) Assignee: Sap Aktiengesellschaft, Walldorf (DE)

( * ) Notice: Subject to any disclaimer, the term of this patent is extended or adjusted under 35 U.S.C. 154(b) by 0 days.

(21) Appl. No.: 09/838,793

(22) Filed: Apr. 20, 2001

(65) Prior Publication Data

US 2002/0032492 A1    Mar. 14, 2002

Related U.S. Application Data

(63) Continuation of application No. 09/033,840, filed on Mar. 3, 1998.

(51) Int. Cl.
*G06F 19/00* (2006.01)

(52) U.S. Cl. .................. 700/99; 700/100; 700/106; 705/8

(58) Field of Classification Search ............ 700/95, 700/102, 100, 99, 106; 705/8
See application file for complete search history.

(56) References Cited

U.S. PATENT DOCUMENTS

| | | | | |
|---|---|---|---|---|
| 5,835,377 A | * | 11/1998 | Bush | 700/99 |
| 5,943,484 A | * | 8/1999 | Milne et al. | 700/100 |
| 5,946,663 A | * | 8/1999 | Tanaka et al. | 705/8 |
| 5,991,528 A | * | 11/1999 | Taylor et al. | 700/95 |
| 6,321,133 B1 | * | 11/2001 | Smirnov et al. | 700/100 |

* cited by examiner

*Primary Examiner*—Albert W. Paladini
(74) *Attorney, Agent, or Firm*—Chadbourne & Parke (57) ABSTRACT

A data model for a supply chain is provided whereby individual working steps in a production process are defined as activities, and organized groups of such activities are defined as orders. Activities are allocated to no more than one resource and contain information concerning the start and finish time for the activity, any resource on which the activity is currently scheduled, and a list of alternative resources, if any. Activities are linked to each other via auxiliary objects, which contain information concerning the minimum and maximum time between activities. Orders may contain input and/or output interface nodes, representing the materials consumed and produced by the order. Each output interface node representing a quantity of material created from one order is linked via an auxiliary object to respective input interface node or nodes from other orders that are scheduled to receive that material. Order anchors are defined whereby a planning algorithm can easily reference an order by its order number in a database table. Planning object anchors allow the planning algorithm to access all the orders for a given material, and resource anchors permit access to all activities scheduled for that resource.

33 Claims, 7 Drawing Sheets

DATA MODEL FOR SUPPLY CHAIN PLANNING

This is a continuation of application Ser. No. 09/033,840 filed Mar. 3, 1998.

BACKGROUND OF THE INVENTION

Supply chain planning, which comprises the logistical plan of an in-house supply chain, is essential to the success of many of today's manufacturing firms. Most manufacturing firms rely on supply chain planning in some form to ensure the timely delivery of products in response to customer demands. Typically, supply chain planning is hierarchical in nature, extending from distribution and production planning driven by customer orders, to materials and capacity requirements planning, to shop floor scheduling, manufacturing execution, and deployment of products. Supply chain planning ensures the smooth functioning of different aspects of production, from the ready supply of components to meet production demands to the timely transportation of finished goods from the factory to the customer.

The modern supply chain often encompasses a vast array of data. The planning applications that create and dynamically revise plans in the supply chain in response to changing demands and capacity require rapid access to data concerning the flow of materials through the supply chain. The efficient operation of the supply chain depends upon the ability of the various plans to adjust to changes, and the way in which the required data is stored determines the ease with which it can be accessed.

In the conventional relational model, supply chain data is stored in multiple relational database tables. If a parameter of a manufacturing order is changed, all of the aspects of the supply chain affected by such change must be re-calculated using the relational tables. Before a planning algorithm can change the date and/or quantity of a manufacturing order in response to changing capacities, for example, it must take into account the effect that the date and/or quantity change will have on other production and sales orders. Such a calculation is very complex, and requires that the algorithm have access to data concerning all the other orders, materials and resources that would be affected by the change. That information is not readily accessible in the conventional model, and instead must be calculated by tracing through relational database tables. Such calculations are cumbersome and delay planning functions unnecessarily.

There is therefore a need for all data relevant to supply chain planning to be stored in an efficient manner which reflects the progress of materials and orders along the supply chain. There is also a need for such data to be made available to planning algorithms in the most efficient and usable manner possible so as to reduce drastically the runtime of the planning functions.

SUMMARY OF THE INVENTION

The present invention relates to a data model for storing objects that are relevant for planning the logistical processes along the entire supply chain of a company.

It is an object of the invention to store manufacturing process data so as to provide planning algorithms and applications programs with the most efficient access possible to the data that they require.

It is a further object of this invention to store the data in a logical manner that reflects the progress of materials and orders along the supply chain.

It is a further object of this invention to define discrete data elements representing individual working steps in the production process, and to store the relationships between said elements.

It is a further object of this invention that specific information about each working step is linked with those data elements, including the start time, finish time, and the resources upon which the working step is performed or alternatively may be performed.

It is a further object of the invention to organize groups of working steps in the manufacturing process as objects that can be accessed by planning algorithms, and to store the relationships between said groups of working steps.

It is a further object of this invention to allow a planning algorithm efficient access to any organized group of working steps in the production process by providing a database table whereby each of the groups of working steps is referenced to its location in the data structure.

It is a further object of this invention to allow a planning algorithm efficient access to the working step performed by a given resource at a specific time, by providing a database table whereby the dates and times of all working steps performed by each resource are referenced to that resource.

It is a further object of the invention to allow a planning algorithm to have efficient access to organized groups of working steps involved in creating or consuming a specific material, by providing a database table whereby information identifying the material is referenced to the input or output of each such organized group of working steps.

In accordance with these and other objects, a data structure is defined whereby individual working steps in the production process are defined as activities, and organized groups of such activities are defined as orders. Activities are allocated to no more than one resource, if any, and contain information concerning the start and finish time for the activity, any resource on which the activity is currently scheduled, and a list of alternative resources, if any. Activities representing a time calculation only are not required to correspond to a resource. Activities are linked to each other via auxiliary objects, which contain information concerning the minimum and maximum time between activities. Orders may contain input and/or output interface nodes, representing the materials consumed and produced by activities within the order. An output interface node representing a quantity of material created from one order is linked via an auxiliary object to respective input interface node or nodes from other orders that require that material. Order anchors are defined whereby a planning algorithm can easily reference an order in the data structure by its order number in a database table. Planning object anchors allow the planning algorithm to access all the orders for a given material, and resource anchors permit access to all activities scheduled for that resource.

DETAILED DESCRIPTION OF THE DRAWINGS

Figure 1:
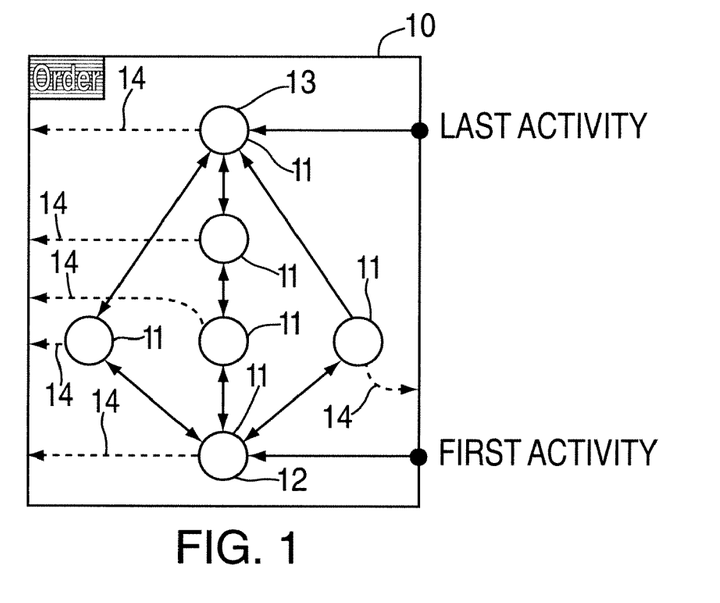
FIG. 1 is a representation of the relationship between an order and its activities.
Figure 2:
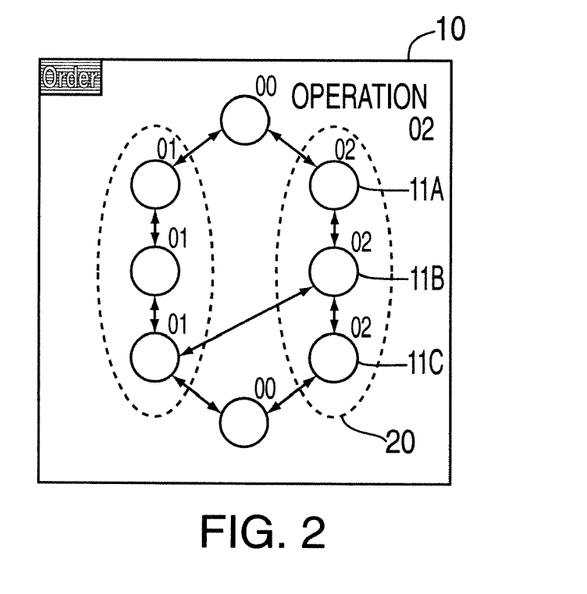
FIG. 2 is a representation of the fusing of activities to make operations.

As shown in FIG. 1, an order 10 represents an organizational unit that may group together several activities 11. Each order points to the first activity and the last activity of its activity network. Thus, order 10 points to activity 12 and activity 13. Each activity 11 contains a reference 14 to its corresponding orders. As depicted in FIG. 2, related activities such as a chain of activities 11a, 11b, and 11c that must be executed in order may be grouped together into an "operation" 20 to avoid having to map each activity individually on a planning table.

Figure 3:
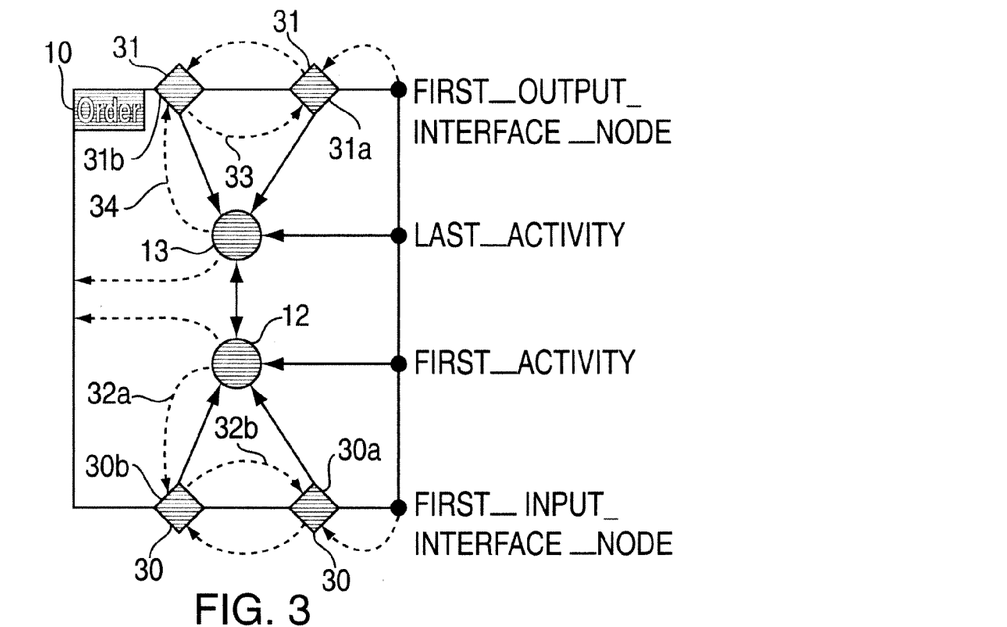
FIG. 3 is a representation of the input and output interface nodes of an order.

An order, such as order 10, may have one or more input interface nodes 30 and/or one or more output interface nodes 31, as shown in FIG. 3. Each input interface node 30 represents one material. An input interface node also has attributes containing information as to the quantity of the material required, the time requirement of the material, and the shortage of that material, which is derived from the difference between the quantity of material required and the quantity that it delivered by other orders or stock. Each output interface node 31 has similar attributes, such as type of material created, the quantity of the material, the time availability of the material, and the surplus of that material, which is derived from the quantity of material produced that is not yet delivered to other orders. Each input interface node 30 may refer to the activity 12, if any, in which the material that it represents is consumed, and each output interface node 31 points to the activity 13, if any, in which the material that it represents is created. If an activity 12 consumes a material, all input materials of this activity can be traced via arrow marked with dashes and dots 32a that points from activity 12 to input interface node 30. If input activity 12 consumes more than one material, arrow 32b joins input interface node 30a to the next input interface node 30b, which links on the same input activity 12. The chain of input interface nodes 30, which can have an infinite length, enables the user to ascertain which materials are required for the order in question, which means that he can determine the bill of materials for the output materials. Similarly, the output materials of an activity can be traced via arrow marked with dashes and dots 34 joining the activity with the first output interface node 31 of the activity 13. If there are several output materials, then an arrow 33 joins output interface node 31a to the next output interface node 31b, which represents the second material created. Like the input interface nodes 30, this chain can have an infinite length.

Figure 4:
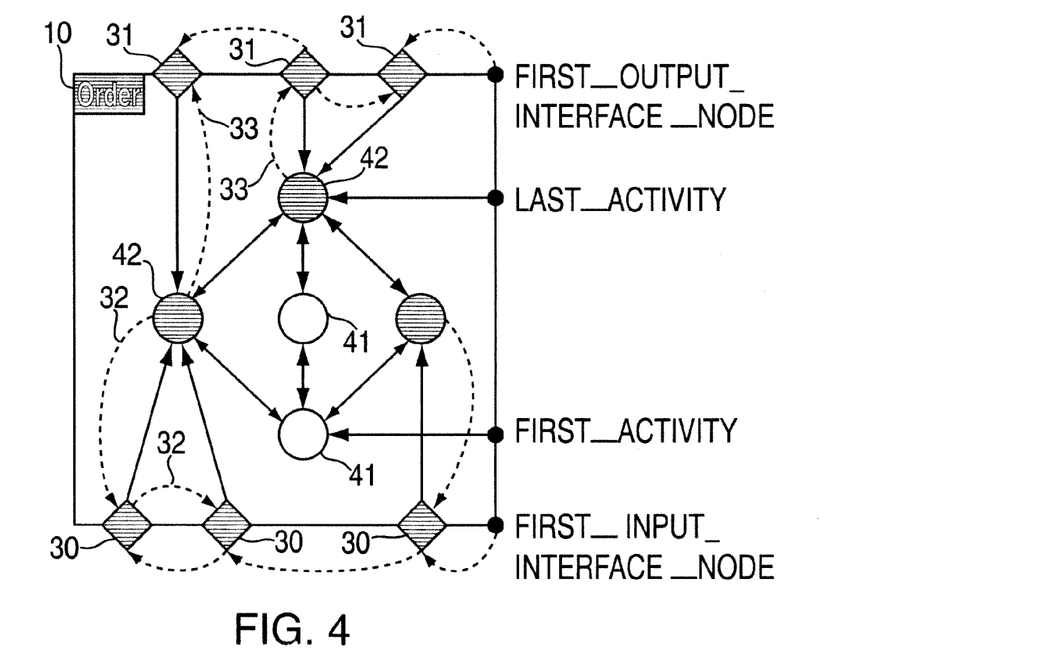
FIG. 4 is a representation of input activities, output activities, and activities with no input or output.

FIG. 4 illustrates order 10 having activities 41 with no input or output materials, and also activities such as assembly process 42 that both consume and create materials. Stock or a purchase order of a material is modeled by an order with one output interface node 31 and with no input interface nodes or activities. If the user wants to take the capacity of the vendor into account in modeling a purchase order, however, the purchase order must contain at least one activity representing the available capacity of the vendor (as accurately as possible). A plurality of purchase orders may be grouped into a "schedule line", which is modeled as a purchase order with several output interface nodes, each with a different delivery time. Customer requirements mirror purchase orders: each order has one input interface node 30, but no output interface nodes or activities. Orders that consume materials such as customer orders are modeled as "issuing elements", while orders that create materials are modeled as "receiving elements", allowing both types of orders to be modeled as objects similar to other components in the SCP model, thereby saving the need to create additional algorithms to operate on the model. An order without input or output interface nodes may exist, for example, as an order representing a test or maintenance on a resource.

Links may also be created between successive activities, said links containing references not only to successor activities, but also to the minimum and maximum time between activities. These temporal constraints can exist both between activities in the same order (inter-order constraints), and between activities belonging to different orders (cross-order constraints).

Figure 5A:
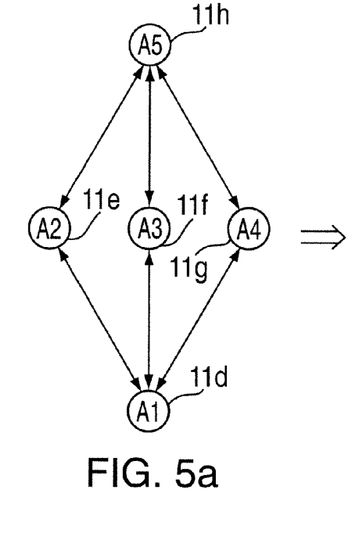
FIG. 5 is a representation of how temporal constraints between activities are modeled.
Figure 5B:
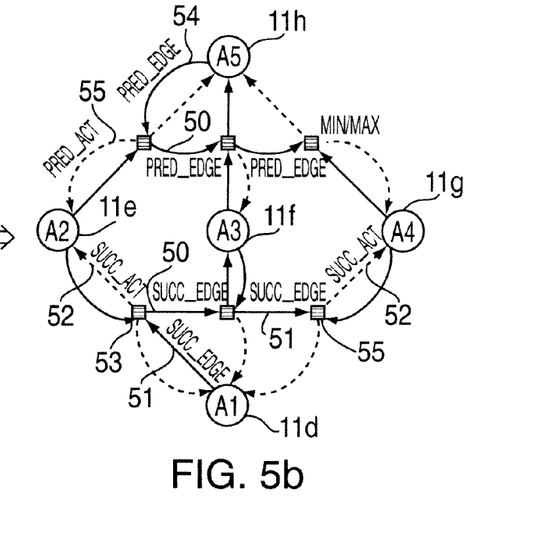

FIG. 5 illustrates inter-order temporal constraints between activities. As shown in FIG. 5a, activity 11d has three successor activities 11e, 11f, and 11g. Edges 50, 51 and 52 representing the temporal constraints have attributes, which are the minimum and maximum time interval between activities, and the type of temporal constraint, such as start-start, start-finish, finish-finish, or finish-start. References to successive activities are modeled by following the full and dotted straight arrows. In FIG. 5b, starting from activity 11d, first follow the arrow "succ_edge" 51 to reach the first successor activity from the small square 53 along the edge "succ_act" 52. This process is repeated from the first small square in order to reach all other successor activities successively. These small squares 53, also known as auxiliary objects, store the references to the successor activities, the next auxiliary object, and all the attributes of the temporal constraint between activities. The same technique can be used to model predecessor constraints, for example by following the curved arrows "pred_edge" 54 and "pred_act" 55 to find the predecessors of activity 11h.

Figure 6:
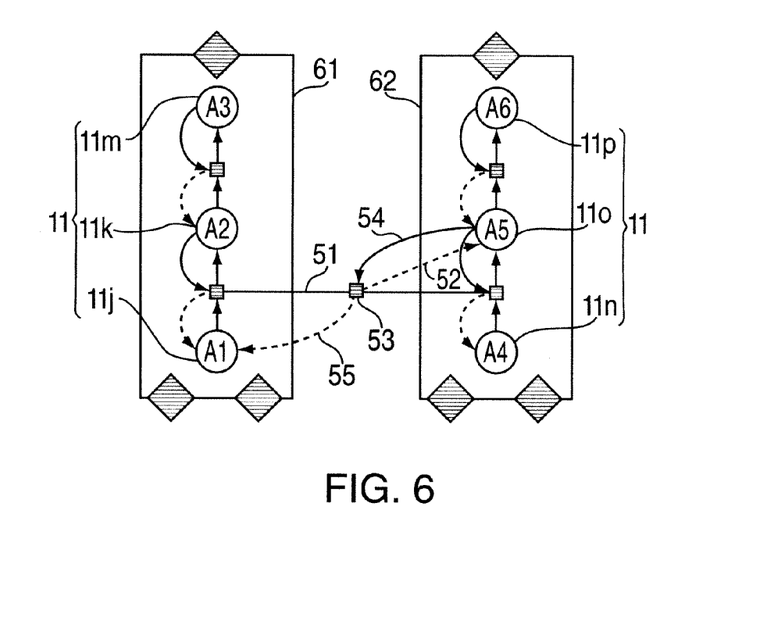
FIG. 6 is a representation of how temporal constraints between orders are modeled.

Cross-order temporal constraints are illustrated in FIG. 6. A first order 61 and a second order 62 each contain three activities 11. There is a cross-order temporal constraint between activity 11j of first order 61 and activity 11n of second order 62. This constraint is mapped in the same way as described above for an inter-order temporal constraint, showing that activity 11j has successor activities 11k and 11o, and that activity 11o has predecessor activities (11j and 11n).

Similarly, "pegging" links two orders wherein one of the orders supplies a material consumed by the other order. Pegging tracks the type and quantity of material supplied by one order (the "subordinate order") to another order (the "superior order"). Pegging allows the planner to ascertain the superior and subordinate orders for any given order at any given time. If the planner reschedules the dates of an order, pegging allows all other orders influenced by this change to be updated.

Figure 7:
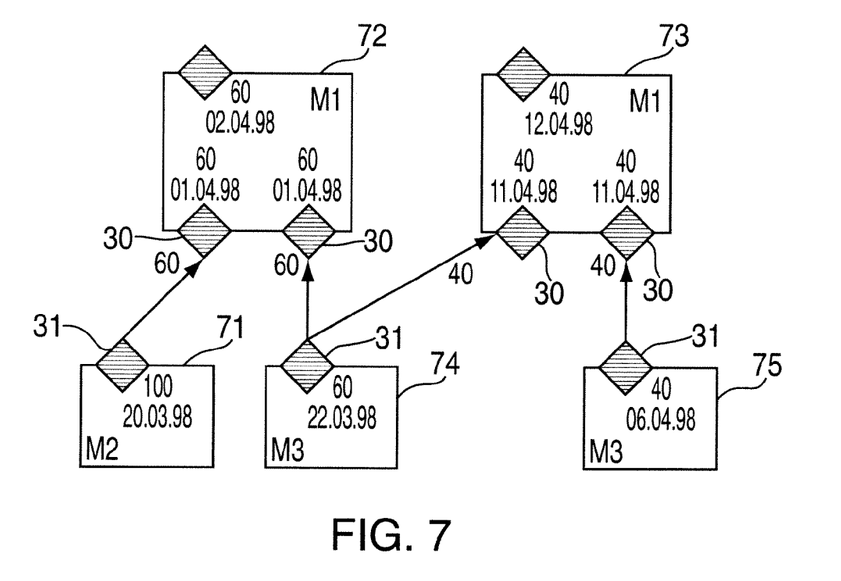
FIG. 7 is a representation of a simple order network with pegging.

FIG. 7 illustrates an example of pegging between orders, consisting of five orders 71, 72, 73, 74 and 75 that produce or consume materials M1, M2 and/or M3. As shown, for example, one piece each of M2 and M3 is required to produce M1. Next to each input interface node 30 is the required quantity and the requirements date, and next to each output interface 31 node is the quantity created and the availability date. For example, order 71 produces 100 M2, which is sufficient to satisfy the demands of orders 72 and 73 producing M1. There are also two separate orders 71 and 75 satisfying the demand of order 73.

Figure 8:
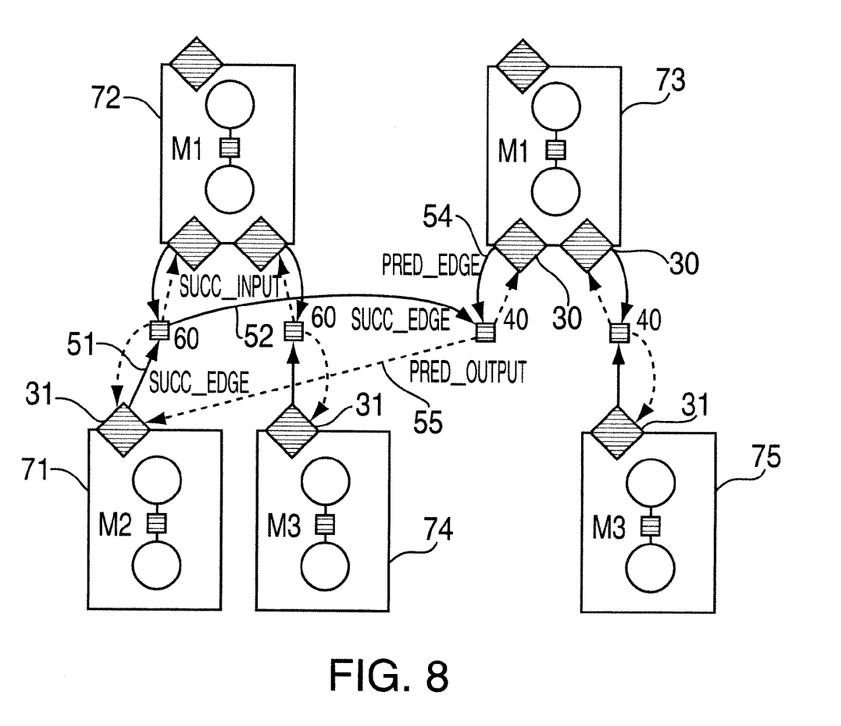
FIG. 8 is a representation of how pegging between orders is modeled.

As shown in FIG. 8, relationships between orders are mapped in the same manner as are temporal constraints between activities. The orders which M2 order 71 supplies can be found by starting from output interface node 31 of the M2 order 71 and alternately following the full straight arrows ("succ_edge") 51 and the dotted straight arrows ("succ_act") 52. Similarly, the orders that supply M1 order 73 can be found by starting from the input interface nodes 30 of M1 order 73, and alternately following the full curved arrows ("pred_edge") 54 and dotted curved arrows ("pred_output") 55 to output interface node 31 of the supplying orders 71 and 75.

Figure 9:
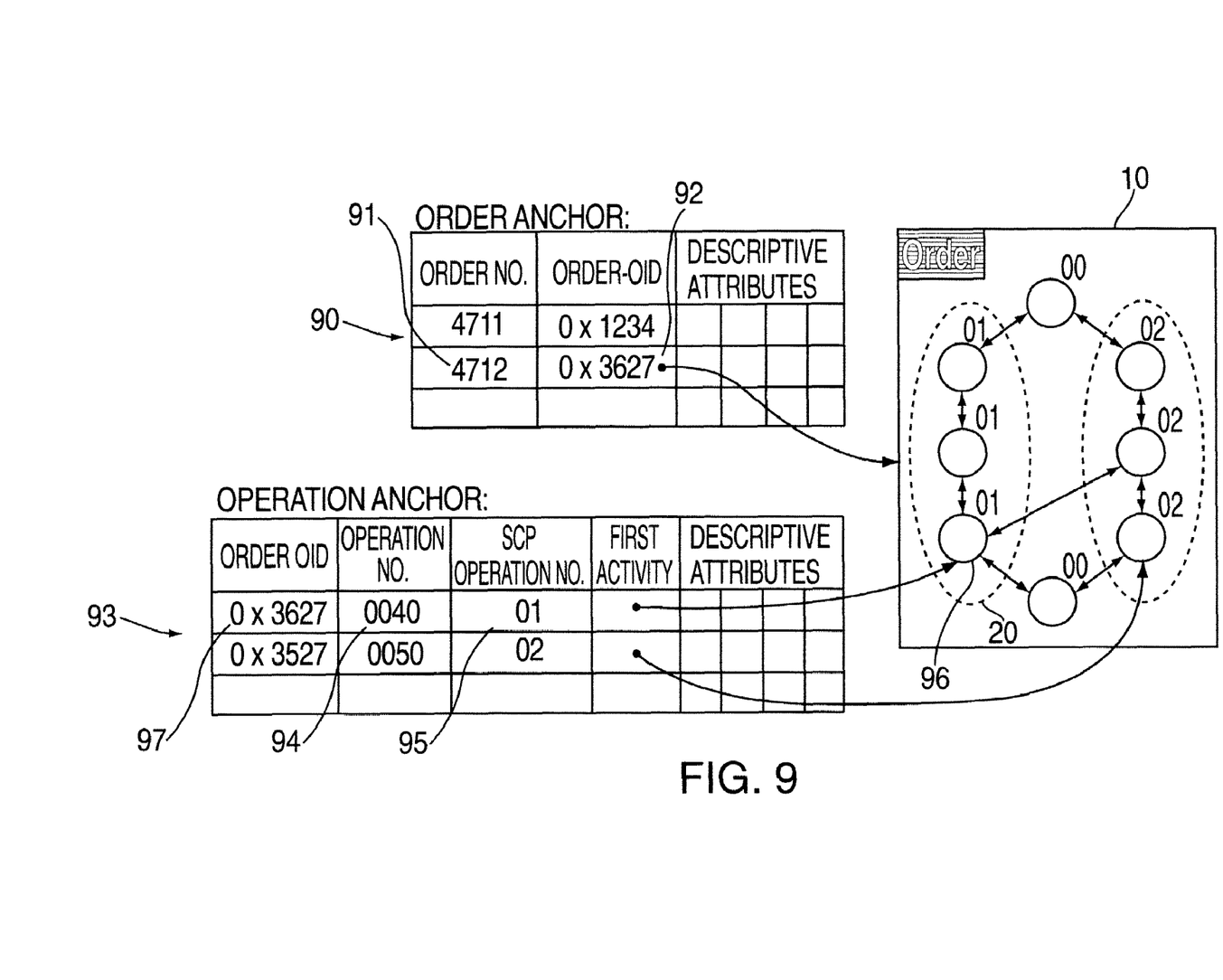
FIG. 9 is a representation of an order anchor and an operation anchor.

While pegging can link a large network of orders, not all orders have relationships to each other. Accordingly, the SCP network is usually a collection of disjunctive sub-networks, making it difficult to scan the whole network to locate a specific order. Accordingly, an "order anchor" 90 as shown in FIG. 9 can provide direct access to an order 10 or group of orders in the SCP network via an "order number" 91. This information is preferably stored in a RAM-buffered relational database table with a primary index for the order number and a secondary index for the reference to the order in the network, or object identity ("OID") 92. Similarly, an "operation anchor" 93 can provide direct access to an operation 20, or fused activities, within an order 10. The key 97 of the operation anchor 93 is the OID 92 for order 10, which is referenced to the predetermined operation number 94, an operation number within that order 95, and the first activity 96 of the respective operation 20. So for an application program to access a certain operation 20 of an order 10, it must first use the order anchor 90 to determine the OID 92 for the order, then use the operation anchor 93 to find the first activity 96 of the operation 20 that it is seeking.

Figure 10:
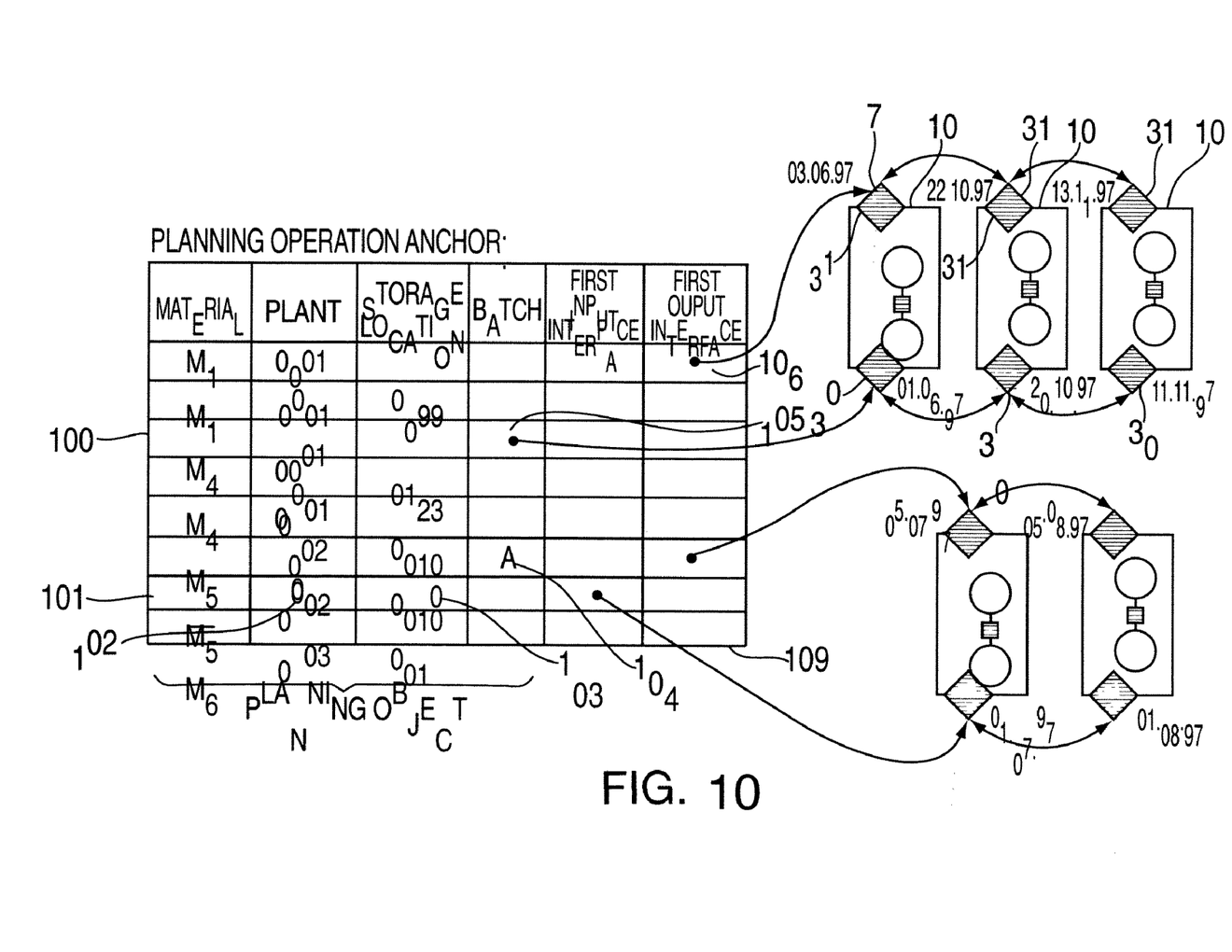
FIG. 10 is a representation of a planning object anchor.

Planning object anchors 100, illustrated in FIG. 10, enable an application program to determine efficiently all the orders 10 for a given material. Each material is identified in a relational database table according to its material number 101, plant 102, storage location 103, and batch 104, collectively known as a "planning object". Planning object anchors in table 109 reference to first input interface node 105 for material M4, and first output interface node 106 for material M1. All input interface nodes 30 and output interface nodes 31 of each material are kept in doubly concatenated lists which are sorted according to requirements and availability dates, as shown in FIG. 10. Thus, it is possible to select all receiving and issuing elements for each material or "planning object", which can be important for materials requirements planning.

Figure 11:
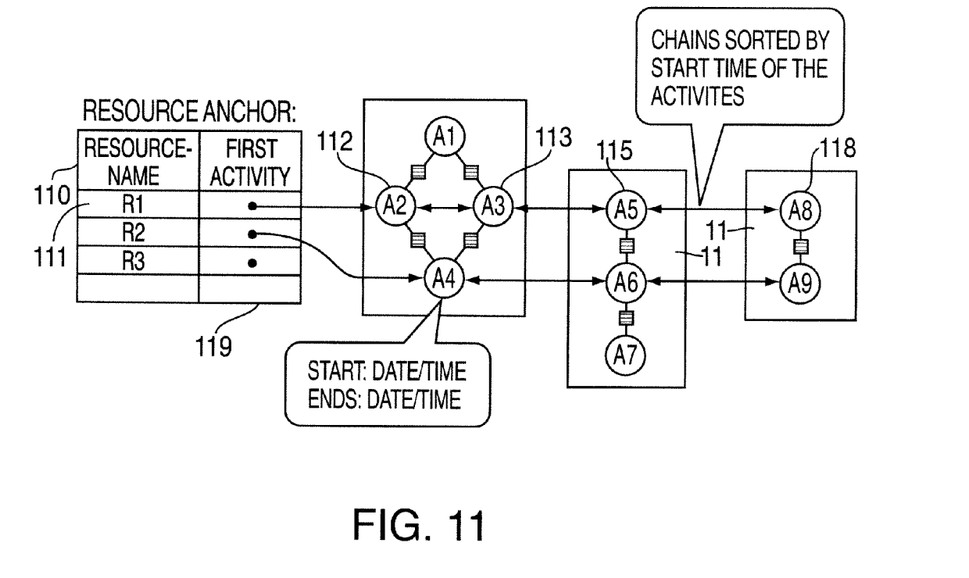
FIG. 11 is a representation of a resource anchor.

Since each activity preferably corresponds to one specific resource, a resource anchor is provided to enable an application program to determine all activities for a specific resource. FIG. 11 depicts a resource anchor 110 modeled as a relational database table 119 that references each resource number 111 to the corresponding first activity A2 scheduled on that resource. The first activity A2 112 is then linked to the next activity A3 113 scheduled on the same resource, which is in turn linked to subsequent activities A5 115 and A8 118 in chronological order according to schedule time. This facilitates the scheduling of new activities on particular resources. For example, in order to schedule a new activity on a resource, an applications program must first check the activity immediately before and the activity immediately after the proposed time for the new activity to determine whether there is sufficient time to perform the new activity on that resource. Since resource anchor 110 stores all activities of a particular resource chronologically referenced to that resource, this information is easily and rapidly accessible to an applications program.

The invention claimed is:

1. A method for monitoring the use of resources and materials in a manufacturing sequence, comprising the steps of:
   storing data representing said manufacturing sequence in a data structure;
   organizing said data in said data structure as one or more orders representing one or more materials being consumed and/or created in said manufacturing sequence;
   linking said orders so that the order that consumes a material follows the order that creates the respective material in said manufacturing sequence;
   linking, for each of said orders, one or more activities representing materials being processed by manufacturing resources;
   linking said activities chronologically within each order, said link between activities further comprising data representing temporal constraints between said activities and temporal constraints between activities in different orders in said manufacturing sequence;
   providing a link from one or more of said activities for one or more orders to a data that identifies a corresponding resource; and
   determining based on a start time for a first of the orders whether a specific resource is in use at any given time during said manufacturing sequence.

2. The method of claim 1, and further comprising the step of determining a time and duration for all of said activities directed to a particular one of said manufacturing resources.

3. The method of claim 1, and further comprising the step of chronologically storing in a database table all activities scheduled to take place in said manufacturing sequence, said storing performed using said data representing temporal constraints between order.

4. The method of claim 1, and further comprising the step of determining the availability of one or more of said manufacturing resources for uses other than said manufacturing sequence by calculating said availability based on said information about temporal constraints between said order for a given manufacturing supply chain.

5. The method of claim 1, and further comprising the step of determining all of said order for a particular one of said materials and determining the quantity of said material that is needed for respective ones of said manufacturing resources.

6. A method for facilitating the dynamic allocation of manufacturing resources and materials in a manufacturing sequence, comprising the steps of:
   storing data for said manufacturing sequence in a data structure, said stored data structure comprising one or more orders representing one or more materials being consumed and/or created in said manufacturing sequence, said orders being linked such that the order that consumes a material follows the order that creates said material in said manufacturing sequence, each of said orders comprising one or more activities representing materials being processed by said manufacturing resources, said activities being linked chronologically within each order, said link between activities further comprising data of temporal constraints between said activities;
   determining a start time for a first activity of said manufacturing sequence; and
   determining using said data of temporal constraints in said data structure start times for all of said activities that are performed on a particular one of said manufacturing resources.

7. The method of claim 6, and further comprising the steps of determining a quantity and time for said materials being supplied to each of said manufacturing resources by providing the start time for the first of said activities of the first of said orders, and determining said start time for each of said orders that consumes said materials using said data of temporal constraints between activities;
   supplying the necessary quantity of said materials to each of said manufacturing resources in said manufacturing sequence at said determined times based on said determined time and quantity for said materials for respective ones of said manufacturing resources.

8. The method of claim 7, and further comprising the step of adjusting said start time for one of said activities based on the unavailability of a particular one of said manufacturing resources, and re-calculating the time at which materials need be supplied to each of said manufacturing resources based on said adjusted start time.

9. The method of claim 6 wherein said data structure further comprises input nodes representing materials consumed by an order and output nodes representing materials created by an order.

10. The method of claim 9, and further comprising the step of determining a bill of materials for an output material by identifying all of the input nodes corresponding to the output node for said material.

11. The method of claim 6, wherein said data structure further comprises data representing temporal constraints between said activities in different orders in said manufacturing sequence.

12. The method of claim 11 and further comprising the step of determining all orders for a specific material and storing said orders in a database of order information.

13. The method of claim 6, and further comprising
   adjusting said start time for one or more of said activities in said manufacturing sequence; and
   using said data structure to dynamically re-calculate said start times for one or more of said activities on subsequent ones of said manufacturing resources.

14. The method of claim 6, and further comprising the step of optimizing the use of said manufacturing resources in real time by dynamically allocating certain of said manufacturing resources to other uses based on the calculated availability of said manufacturing resources in said manufacturing sequence.

15. A system for supply chain planning, said system having means for storing data in a data structure, so that an application program can access data therein, said stored data structure comprising:
   a plurality of orders, at least one of said orders having a pre-assigned order number, stored in the means for storing, each said order comprising:
   a) one or more activities each representing a working step that is indivisible from a production planning perspective, and each being linked to a reference to all immediately preceding activities;
   b) one or more input interface nodes each representing a material consumed by said order, each input interface node being linked to all activities that consume said material;
   c) one or more output interface nodes each representing a material created by said order, each output interface node being linked to all activities that create said material; and
   d) a database table having an entry for each pre-assigned order number matched to a corresponding object identity, which is a reference to the respective order;
wherein one of said orders being a first order, each output interface node of said first order being linked to a respective input interface node of each of the other of said orders subsequent to said first order that are scheduled to consume the material associated with said output interface node of said first order.

16. The system of claim 15, wherein said reference to all immediately preceding activities each have attributes, said attributes including a minimum and a maximum time interval between the linked activities and a type of temporal constraint.

17. The system of claim 15, wherein each activity has at least four attributes, said attributes including a start time, a finish time, a reference to the resource on which the activity is currently scheduled, and a reference to a list of one or more alternative resources.

18. The system of claim 15, wherein each input interface node contains data identifying a required material, a required quantity, a time at which said required material is required, and any shortage of said required material, said shortage being defined as a difference between the required quantity and the quantity of said required material that is delivered by other orders or stock, each output interface node containing data identifying a created material, a created quantity, a time at which said created material is created, and any surplus of said created material, said surplus defined as a difference between the created quantity and the quantity of said created material that is not yet delivered to other orders.

19. The system of claim 15, wherein said database table is stored in memory which includes a RAM buffer.

20. The system of claim 15, wherein when an order comprises a plurality of said activities therein, two or more of said activities together constituting an operation, each operation having a pre-assigned operation number, said data structure further comprising a database table having an entry storing each object identity and pre-assigned operation number matched to the earliest activity of the respective operation.

21. The system of claim 15, wherein each material has a pre-assigned material number, said data structure further comprising a database table having an entry for each pre-assigned material number matched to a reference to at least one input interface node at which the respective material is consumed, and an entry for each pre-assigned material number matched to a reference to at least one output interface node at which the respective material is created.

22. The system of claim 21, wherein said database table further comprises data identifying each material, said data identifying at least one of plant, storage location, and batch.

23. The system of claim 15, wherein each resource has a pre-assigned resource number, said data structure further comprising a database table having an entry for each pre-assigned resource number matched to a chronological sequence of activities scheduled on the respective resource.

24. The system of claim 15 wherein one of said at least one order has k output interface nodes, representing an order producing k different materials.

25. The system of claim 15, wherein a plurality of activities are grouped to form an operation, and wherein the first activity of said operation represents a set up for production, and wherein the successive activities of said operation each represents steps in production.

26. A data structure stored so as to be accessed by an application program for supply chain planning in a data processing system, comprising:
   a plurality of orders, each of said plurality of orders having at least one of:
   a) one or more input interface nodes, wherein each input interface node represents a material consumed by said order; and b) one or more output interface nodes, wherein each output interface node represents a material created by said order;

wherein one of said orders being a first order, one or more of said output interface nodes of said first order is linked to a respective input interface node of each subsequent order scheduled to consume the material associated with said output interface node of said first order.

27. The system of claim 26, said plurality of orders including n orders and one subsequent order, each output interface node of said n orders being linked to a respective input interface node of said one subsequent order such that said one subsequent order consuming the materials supplied by said n orders.

28. The system of claim 26, said plurality of orders including a first order and m subsequent orders, each input interface node of said m subsequent orders being linked to a respective input interface node of said first order such that said first order supplies the material demands of said m subsequent orders.

29. The system of claim 26, wherein each input interface node contains information regarding a required material, required quantity, the time at which said required material is required, and any shortage of said required material, said shortage defined as the difference between the required quantity and the quantity of said required material that is delivered by other orders or stock, and wherein each output interface node contains information regarding a created material, created quantity, the time at which said created material is created, and any surplus of said created material, said surplus defined as the difference between the created quantity and the quantity of said created material that is not yet delivered to other orders.

30. The system of claim 29, wherein each of said at least one order has a pre-assigned order number, said data structure further comprising a database table having an entry for each pre-assigned order number matched to its object identity, which is a reference to the respective order.

31. The system of claim 26, wherein each material has a pre-assigned material number, said data structure further comprising a database table having an entry for each pre-assigned material number matched to a reference to at least one input interface node at which the respective material is consumed, and an entry for each pre-assigned material number matched to a reference to at least one output interface node at which the respective material is created.

32. The system of claim 31, wherein said database table further comprises identifying information for each material including at least one of plant, storage location, and batch.

33. A system for supply chain planning, said system comprising means for storing data and a data structure stored on said means for storing so that an application program can access data therein, said stored data structure comprising:

a plurality of orders having a pre-assigned order numbers, each said order representing at least one activity, wherein
  a) each activity representing a working step that is indivisible from a production planning perspective;
  b) each activity being linked to a reference to all immediately subsequent activities;
  c) each activity being linked to a reference to all immediately preceding activities;
  d) said reference to all immediately preceding activities and said references to all immediately subsequent activities each have at least two attributes, including a minimum and a maximum time interval between activities and a type of temporal constraint;
  e) a plurality of said activities within at least one of the orders constitutes an operation, having a pre-assigned operation number;

a database table having an entry for each pre-assigned order number matched to an object identity, which is a reference to the respective order; and a database table having an entry for each object identity and pre-assigned operation number matched to the earliest activity of the respective operation.

* * * * *

UNITED STATES PATENT AND TRADEMARK OFFICE
CERTIFICATE OF CORRECTION

| | | |
|---|---|---|
| PATENT NO. | : 7,532,945 B2 | Page 1 of 1 |
| APPLICATION NO. | : 09/838793 | |
| DATED | : May 12, 2009 | |
| INVENTOR(S) | : Volkmar A. Sohner | |

It is certified that error appears in the above-identified patent and that said Letters Patent is hereby corrected as shown below:

Col. 4, line 28, delete the word "lid" and insert -- 11d --.

Signed and Sealed this

Fourteenth Day of July, 2009

JOHN DOLL
*Acting Director of the United States Patent and Trademark Office*